United States Patent
Day

(10) Patent No.: US 8,281,054 B2
(45) Date of Patent: Oct. 2, 2012

(54) METHODS AND APPARATUS FOR IMPROVED HOST/INITIATOR UTILIZATION IN SERIAL ADVANCED TECHNOLOGY ATTACHMENT COMMUNICATION

(75) Inventor: Brian A. Day, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/870,975

(22) Filed: Aug. 30, 2010

(65) Prior Publication Data

US 2012/0054404 A1 Mar. 1, 2012

Related U.S. Application Data

(63) Continuation-in-part of application No. 12/868,279, filed on Aug. 25, 2010.

(51) Int. Cl.
*G06F 3/00* (2006.01)
*G06F 5/00* (2006.01)

(52) U.S. Cl. ............... 710/57; 710/65; 712/215

(58) Field of Classification Search ............ 710/57
See application file for complete search history.

(56) References Cited

U.S. PATENT DOCUMENTS

| 7,032,042 | B2* | 4/2006 | Jeppsen et al. ............ 710/60 |
| 2005/0015549 | A1* | 1/2005 | Dierks et al. ............ 711/118 |
| 2006/0004935 | A1* | 1/2006 | Seto et al. ............ 710/62 |
| 2006/0218324 | A1* | 9/2006 | Zayas ............ 710/65 |
| 2007/0136521 | A1 | 6/2007 | Voorhees et al. |
| 2008/0183921 | A1* | 7/2008 | Chang et al. ............ 710/58 |
| 2008/0263307 | A1* | 10/2008 | Adachi ............ 711/171 |
| 2009/0077276 | A1* | 3/2009 | Kato et al. ............ 710/39 |

FOREIGN PATENT DOCUMENTS

| EP | 1722304 A2 | 11/2006 |
| JP | 2004030042 | 1/2004 |
| JP | 2010092285 | 4/2010 |

* cited by examiner

*Primary Examiner* — Elias Mamo
(74) *Attorney, Agent, or Firm* — Duft Bornsen & Fishman LLP

(57) ABSTRACT

Methods and apparatus for improved performance in communications between a SAS/STP initiator device and a plurality of SATA storage devices coupled with the initiator through an enhanced switching device. The switching device is enhanced in accordance with features and aspects hereof to receive a DMA SETUP FIS from a SATA storage device and to transmit multiple modified DMA SETUP FISs to the initiator where each modified DMA SETUP FIS comprises a subcount less than the maximum count in the received DMA SETUP FIS.

18 Claims, 4 Drawing Sheets

METHODS AND APPARATUS FOR IMPROVED HOST/INITIATOR UTILIZATION IN SERIAL ADVANCED TECHNOLOGY ATTACHMENT COMMUNICATION

RELATED PATENTS

This application is a continuation in part of U.S. patent application Ser. No. 12/868,279, filed Aug. 25, 2010, entitled Methods And Apparatus for Improved Host/Initiator Utilization in Serial Advanced Technology Attachment Communication, which is incorporated herein by reference.

BACKGROUND

1. Field of the Invention

The invention relates generally to storage system performance and more specifically relates to methods and apparatus for improving initiator performance in communications between a Serial Attached SCSI Serial Advanced Technology Attachment Tunneling Protocol (SAS/STP) initiator device and a plurality of SATA target devices through a Serial Attached SCSI (SAS) expander.

2. Discussion of Related Art

In storage systems, a host system communicates with one or more storage devices. In SATA storage systems configured in a SAS domain, a SAS/STP initiator device (e.g., a host system) communicates with a SATA target device (e.g., a SATA storage device such as a disk drive). In native SATA configurations, a host system (a native SATA host controller) couples with a single SATA storage device to exchange data with the single SATA storage device. In SATA Native Command Queuing (NCQ) protocol, the SATA Device sends a DMA SETUP Frame Information Structure (FIS) to the SATA host to indicate that it is now ready to receive data from the host to the device. Although the SATA protocol provides a mechanism for the device to use multiple DMA SETUP FISs to complete a large I/O (for example 500 megabytes), in practice the SATA storage devices will choose to send a single DMA SETUP FIS for the entire I/O size (e.g., 500 megabytes as in the previous example). This capability is referred as Non-Zero Buffer Offset in the SATA specification. Since typical SATA disk drives do not provide sustained data transfer over such large volumes of data, this SATA standard technique results in large periods of stalling due to flow control signals/frames on the SATA interface.

In the typical desktop personal computer/workstation environment, this problem is largely a non-issue since the SATA interface is a point-to-point interface between the host and the single device. This stalling behavior does not affect any other devices.

However, when using SATA storage devices in a Serial Attached SCSI (SAS) topology using the SATA Tunneling Protocol (STP), these periods of stalling can be wasteful in that they consume other SAS resources (particularly SAS connection pathways that could be used for other connections but for the stalled connection with one SATA device that has stalled the large DMA transfer). However, the SAS Initiator or SATA host has no real knowledge of the SATA storage device's internal buffer state and therefore cannot intelligently determine how much data the drive can actually sustain. In a SAS topology coupling a plurality of SATA storage devices to a SAS controller (e.g., through a SAS expander), the overall system performance is degraded by this SATA feature.

Thus, it is an ongoing challenge to improve performance of a SATA storage system as regard utilization of a SAS initiator acting as a SATA host coupled with multiple SATA storage devices.

SUMMARY

The present invention solves the above and other problems, thereby advancing the state of the useful arts, by providing methods and apparatus for enhanced performance in communications between a SAS/STP initiator and multiple SATA target devices through an enhanced SAS expander. The expander is enhanced in accordance with features and aspects hereof to receive a DMA SETUP FIS from a storage device and to transmit multiple modified DMA SETUP FISs to the SAS/STP initiator where each modified DMA SETUP FIS comprises a subcount less than the maximum count in the received DMA SETUP FIS.

In one aspect hereof, a method is provided, operable in a switching device adapted to couple with an initiator and adapted to couple with a plurality of SATA storage devices. The method comprises receiving a DMA SETUP FIS from a SATA storage device. The DMA SETUP FIS comprises a maximum size of data to be transferred from the initiator before another DMA SETUP FIS is required. The method then transmits a plurality of modified DMA SETUP FISs to the initiator. Each modified DMA SETUP FIS comprises a subcount size less than the maximum size. The sum of the subcount size of each modified DMA SETUP FIS is not greater than the maximum size.

Another aspect hereof provides a method operable in a SAS expander for transferring data from a SAS/STP initiator coupled with the expander to a SATA storage device of a plurality of SATA storage devices coupled with the expander. The method comprises receiving a Register FIS comprising a command (hereinafter also referred to as a "COMMAND FIS") from the SAS/STP initiator wherein the COMMAND FIS comprises an I/O request size indicating the size of data to be exchanged with the SATA storage device. The method then transmits the COMMAND FIS to the SATA storage device. The method also comprises a) receiving a DMA SETUP FIS from the SATA storage device. The DMA SETUP FIS comprises a maximum size of data that may be transferred to the SATA storage device in response to the DMA SETUP FIS. The method also comprises b) determining a subcount size less than the maximum size and c) transmitting a modified DMA SETUP FIS to the SAS/STP initiator wherein the modified DMA SETUP FIS comprises the subcount size. The method then comprises d) transferring data between the SAS/STP initiator and the SATA storage device wherein the amount of data forwarded is no greater than the subcount size. The method then comprises e) repeating steps b), c), and d) until the amount of data exchanged is equal to the maximum size or is equal to the I/O request size. Lastly, the method also comprises repeating the steps of a), b), c), d), and e) until the amount of data exchanged is equal to the I/O request size.

Yet another aspect hereof provides a switching device comprising a front-end port adapted for coupling the switching device with an initiator and a plurality of back-end ports each adapted to couple the switching device with a corresponding SATA storage device. The switching device also comprises bridge logic coupled with the front-end port and coupled with the plurality of back-end ports. The bridge logic is adapted to receive a DMA SETUP FIS from a SATA storage device through its corresponding back-end port. The DMA SETUP FIS comprises a maximum size of data to be transferred from the initiator before another DMA SETUP FIS is required. The bridge logic is further adapted to transmit a plurality of modified DMA SETUP FISs to the initiator wherein each modified DMA SETUP FIS comprises a subcount size less than the maximum size and wherein the sum of the subcount size of each modified DMA SETUP FIS is not greater than the maximum size.

DETAILED DESCRIPTION OF THE DRAWINGS

Figure 1:
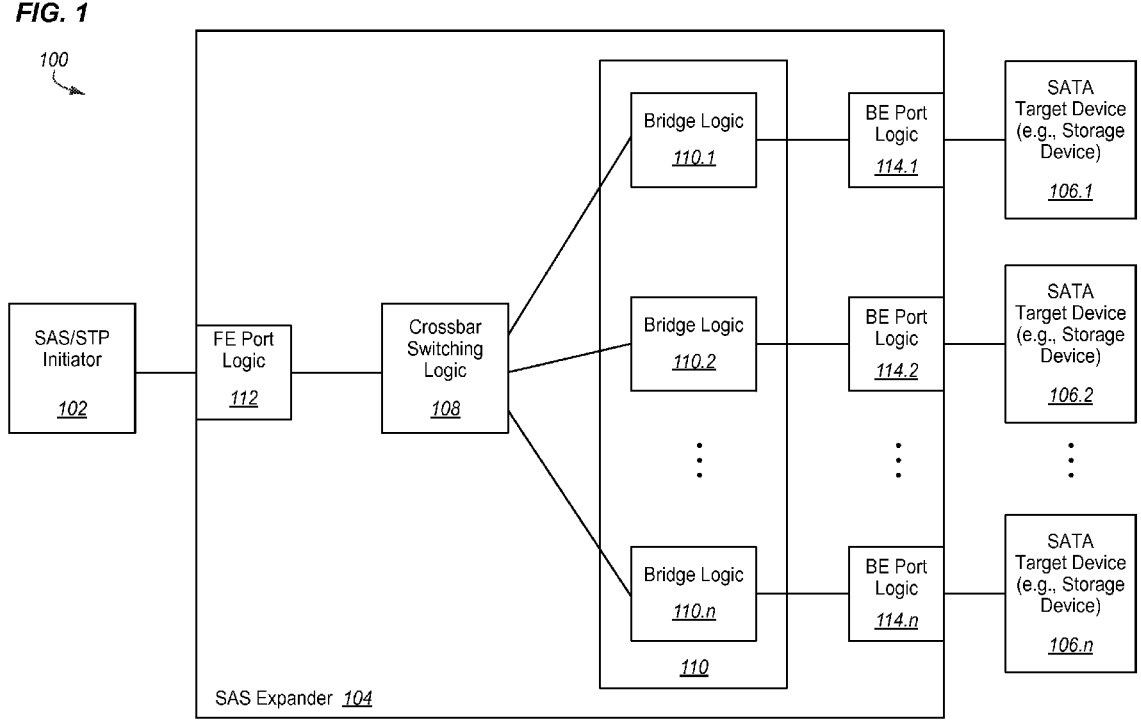
FIG. 1 is a block diagram of an exemplary system comprising an enhanced switching device adapted to improve performance in communication between an initiator device and a plurality of SATA storage devices in accordance with features and aspects hereof.

FIG. 1 is a block diagram of a system 100 enhanced in accordance with features and aspects hereof to improve performance of the system in communications between an initiator device (e.g., a SATA host/initiator) and multiple SATA target devices through an enhanced switching device 104 (e.g., an enhanced SAS expander 104 in a SAS domain topology). Switching device 104 couples initiator 102 with a plurality of SATA target devices 106.1 through 106.n. Initiator 102 may be any device adapted for communicating with one or more SATA storage devices through an intermediate switching device. In one exemplary embodiment, initiator 102 may be any device adapted for communications utilizing the SAS protocols and more specifically adapted for communications utilizing the SATA Tunneling Protocol (STP) of the SAS architecture. In such an embodiment, initiator 102 may be a SAS/STP initiator. SATA target devices 106.1 through 106.n may be any devices adapted to receive and process I/O requests in accordance with the SATA protocol. In particular, each SATA target device 106.1 through 106.n may be a SATA storage device such as a rotating magnetic or optical disk drive or a semi-conductor storage device such as a RAMdisk or flash memory storage device.

Switching device 104 may be any device adapted to couple initiator 102 to any of a plurality of SATA storage devices 106.1 through 106.n. In one exemplary embodiment, switching device 104 may be a SAS expander 104 comprising numerous standard components typical in any SAS expander. Such standard components may include, for example, front-end port logic 112 and back-end port logic 114.1 through 114.n. Front-end port logic 112 may be any circuit within the SAS expander 104 adapted to process physical and link layer aspects of the SAS protocols (as well as other layers of the protocols). In like manner, back-end port logic 114.1 through 114.n each comprise any circuit within SAS expander 104 adapted to process physical and link layer aspects of the SAS and/or SATA protocols for coupling expander 104 with a plurality of SATA storage devices 106.1 through 106.n. Still further, crossbar switching logic 108 within SAS expander 104 comprises any suitable circuit for controllably switching SAS/STP initiator 102 (coupled through front-end port logic 112) to any of the SATA storage devices 106.1 through 106.n (through its corresponding back-end port logic circuits 114.1 through 114.n).

SAS expander 104 is enhanced to comprise bridge logic 110 adapted for improving communication performance between SAS/STP initiator 102 and multiple SATA storage devices 106.1 through 106.n. As noted above, in prior SAS expanders, SAS/STP initiator 102 may be logically connected to a single SATA storage device for the entire duration of a transfer having a maximum length indicated by a DMA SETUP FIS received from that SATA storage device. Though the maximum transfer length indicated by the DMA SETUP FIS indicates a maximum DMA transfer allowed from the SAS/STP initiator 102, mechanical latency and other overhead processing issues within the SATA storage device 106.1 may temporarily pause the DMA transfer (using flow control features of the SAS protocol). During such pauses, prior SAS expanders provided no mechanism to permit SAS/STP initiator 102 to perform I/O processing directed toward other SATA storage devices. By contrast, bridge logic 110 of enhanced SAS expander 104 permits the SAS/STP initiator to process I/O requests directed to other SATA storage devices while a first SATA storage device may have paused a data transfer from the SAS/STP initiator 102.

More specifically, bridge logic 110 comprises bridge logic components 110.1 through 110.n each associated with a respective back-end port logic 114.1 through 114.n coupling the expander with a corresponding SATA storage device 106.1 through 106.n. Bridge logic 110 in operation receives a DMA SETUP FIS from a SATA storage device responsive to a COMMAND FIS sent to the storage device by SAS/STP initiator 102. The maximum original transfer size associated with the received DMA SETUP FIS is then broken into multiple modified DMA SETUP FISs each indicating a subcount less than the original maximum transfer size. These multiple modified DMA SETUP FIS are then transferred to SAS/STP initiator 102 to permit the initiator to process DMA transfers for I/O requests directed to other SATA storage devices between the multiple modified DMA SETUP FISs.

In one exemplary embodiment, bridge logic 110 may determine the subcount as a predetermined fixed buffer size. The predetermined fixed buffer size may be statically or dynamically configured at initialization or installation of expander 104. A manual process may be utilized by the system administrator in configuring the predetermined fixed buffer size based on heuristics and measured performance of the system and/or of the individual storage devices. Any number of factors may be considered in determining the predetermined fixed buffer size used for the subcount in each of the multiple modified DMA SETUP FISs to be transmitted to SAS/STP initiator 102.

Figure 2:
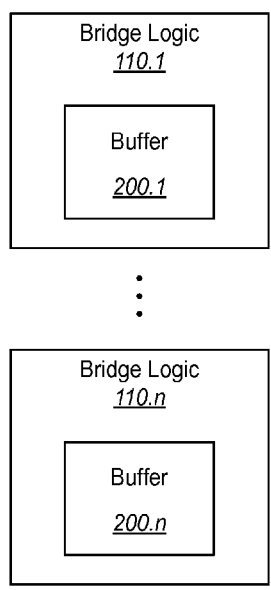
FIGS. 2 and 3 are block diagrams providing exemplary additional details of the bridge logic of FIG. 1 in accordance with features and aspects hereof.

In another exemplary embodiment, bridge logic 110 may comprise one or more buffer memories such that the subcount used in each modified DMA SETUP FIS is determined based on the size of the buffer memory in the bridge logic 110. For example, as shown in FIG. 2, each component bridge logic 110.1 through 110.n may comprise an associated buffer 200.1 through 200.n, respectively. The subcount used in such an embodiment is therefore determined based on the size of the buffer 200.1 through 200.n associated with bridge logic 110.1 through 110.n, respectively.

Figure 3:
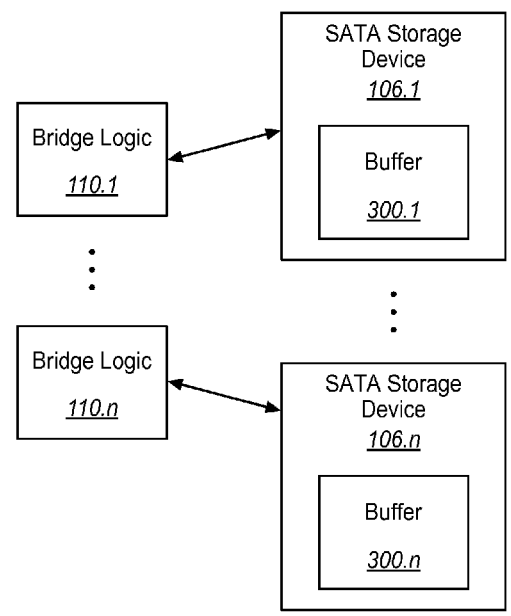

In yet another exemplary embodiment, bridge logic 110 may be devoid of such a buffer and determines the subcount used in each modified DMA SETUP FIS based on the size of a buffer within each SATA storage device 106.1 through 106.n. As shown in FIG. 3, each bridge logic component 110.1 through 110.n may query SATA storage device 106.1 to determine the size of its respective buffer 300.1 through 300.n.

Though FIG. 1 is discussed primarily with reference to a SAS topology environment (e.g., SAS initiator 102 coupled through SAS expander 104) it will be readily understood that switching device 104 may be any suitable device that couples any initiator device to any of a plurality of SATA storage devices. For example, switching device 104 could be a Fibre Channel or Ethernet switch adapted to couple an initiator device to any of a plurality of SATA storage devices. Still further, initiator 102 need not be SAS/STP initiator device but rather could be any device for initiating contact with a target device. Switching device 104 could therefore also comprise protocol translation features for converting between protocols used between the switching device 104 and initiator 102 and protocols used between switching device 104 and the SATA storage devices 106.1 through 106.n.

Those of ordinary skill in the art will readily recognize numerous additional and equivalent components that may be present in a fully functional switching device 104. Such additional and equivalent components are omitted herein for simplicity and brevity of this discussion. Thus, the features shown in FIGS. 1 through 3 are intended merely to suggest exemplary embodiments for implementing enhanced features and aspects hereof. In particular, bridge logic 110 may be implemented as a single circuit component, as multiple bridge logic circuits (one for each back-end port), or may be integrated with other circuit component of switching device 104. Such design choices are well-known to those of ordinary skill in the art. Further, those of ordinary skill in the art will readily recognize that any number of port logic elements may be present in a fully functional switching device 104 as appropriate for the particular environment. Still further, switching device 104 may be coupled with any desired number of initiator devices and SATA storage devices as appropriate to the particular needs of the enterprise.

Figure 4:
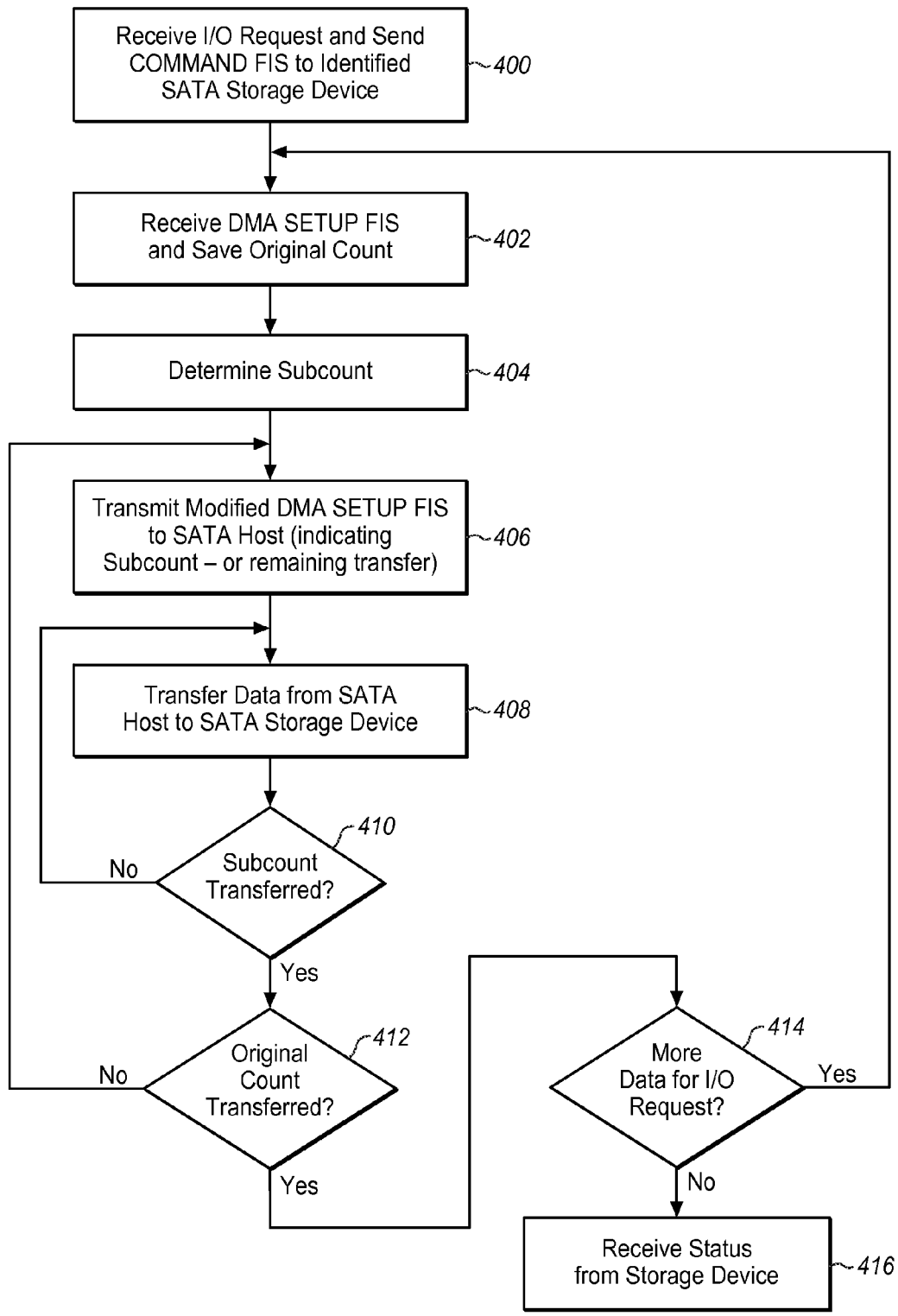
FIGS. 4 through 7 are flowcharts describing exemplary methods providing enhanced performance in communication between a SAS/STP initiator and a plurality of SATA storage devices through an enhanced SAS expander in accordance with features and aspects hereof.

FIG. 4 is a flowchart describing an exemplary method for improving communications between an initiator device and a plurality of SATA storage devices through an enhanced switching device (e.g., SAS expander) in accordance with features and aspects hereof. The method of FIG. 4 may be generally operable in enhanced SAS expander 104 of FIG. 1 and more specifically operable in conjunction with bridge logic 110 of enhanced SAS expander 104. At step 400, an I/O request is received from the SAS/STP initiator. The received request is forwarded to the identified SATA storage device as an appropriate COMMAND FIS requesting that the storage device prepare for the indicated I/O request (e.g., a write command to be followed by a number of DATA FISs from the SAS/STP initiator to the SATA storage device when the device is ready to receive the data). At step 402, the expander receives a first DMA SETUP FIS from the identified SATA storage device. The DMA SETUP FIS comprises a maximum count for the amount of data that may be transferred in a single DMA operation (e.g., the "original" count). This original count may be saved in a memory or register associated with the bridge logic corresponding to the SATA storage device from which the DMA SETUP FIS was received. At step 404, a subcount is determined to be used for each of a plurality of modified DMA SETUP FISs to be sent to the SAS/STP initiator. As noted above, the subcount may be determined as a predetermined fixed buffer size or may be determined based on the size of a buffer associated with the bridge logic and/or associated with the identified SATA storage device.

At step 406, a modified DMA SETUP FIS is sent to the SAS/STP initiator. The modified DMA SETUP FIS comprises the determined subcount (or a lesser remaining transfer count for the I/O request). The modified DMA SETUP FIS allows the SAS/STP initiator to prepare for a smaller DMA transfer such that the DMA circuits of the SAS/STP initiator (as well as any DMA circuits associated with the SAS expander) will not be tied up for an extended duration should be SATA storage device pause the data transfer due to overhead processing or other latencies within the SATA storage device. At step 408, the SAS expander transfers data from the SAS/STP initiator to the identified SATA storage device up to a maximum count equal to the subcount provided in the modified DMA SETUP FIS. Step 410 determines whether the subcount amount of data has been transferred (or if the entire I/O request transfer has been completed). If not, processing continues looping back to step 408 to continue transferring data from the SAS/STP initiator to the SATA storage device until the subcount has been exhausted (or the entire I/O request has been transferred). At step 412, the bridge logic of the SAS expander determines whether an amount of data equal to the original count of the received DMA SETUP FIS has been transferred from the SAS/STP initiator to the SATA storage device. If not, processing continues looping back to step 406 to transmit a next modified DMA SETUP FIS enabling transfer of another subcount amount of data from the SAS/STP initiator. When the original count amount of data has been transferred, step 414 next determines whether more data needs to be transferred to complete the entirety of the received I/O request. If so, processing continues looping back to step 402 to await receipt of a next DMA SETUP FIS from the SATA storage device. When the all data for the I/O request is completely transferred, step 416 then receives a completion status from the SATA storage device for return to the SAS/STP initiator to thereby complete the I/O request.

Thus, the method of FIG. 4 breaks up or subdivides the original count in each received in each DMA SETUP FIS received from the SATA storage device into multiple modified DMA SETUP FISs to be sent to the SAS/STP initiator. Each modified DMA SETUP FIS comprises a subcount—a subset of the maximum original count of the received DMA SETUP FIS. By this method the SAS/STP initiator (in particular DMA circuits of the SAS/STP initiator) need not be tied up and dedicated to a single SATA storage device while that SATA storage device may incur delays or latencies due to overhead processing within the device. Rather, the SAS/STP initiator (and more specifically the DMA circuits of the initiator) may be reconfigured to initiate similar transfers to other SATA storage devices coupled with the SAS expander. Thus, the overall performance of the system in communicating between a SAS/STP initiator and multiple SATA storage devices may be improved by reducing delays incurred due to latency and overhead processing of any one of the multiple storage devices.

It will be readily recognized by those of ordinary skill in the art that the method of FIG. 4 is operable substantially concurrently for each of the multiple storage devices. In other words, bridge logic of the enhanced SAS expander is performing the method of FIG. 4 for each of multiple DMA transfers between the SAS/STP initiator and the multiple storage devices.

Figure 5:
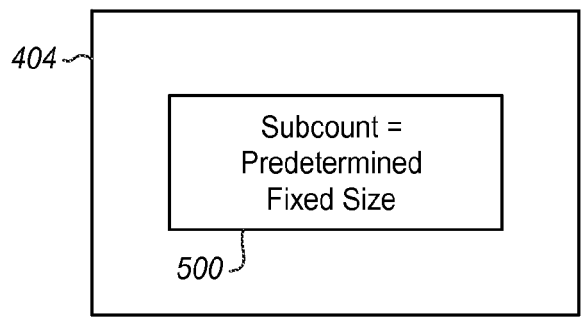
Figure 6:
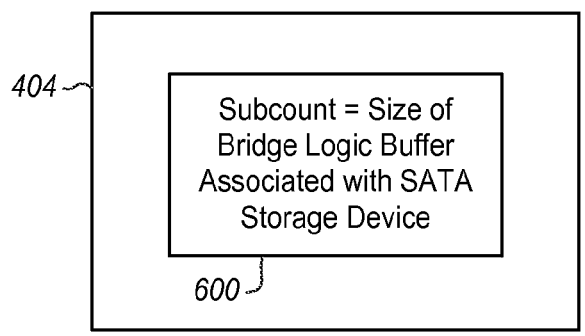
Figure 7:
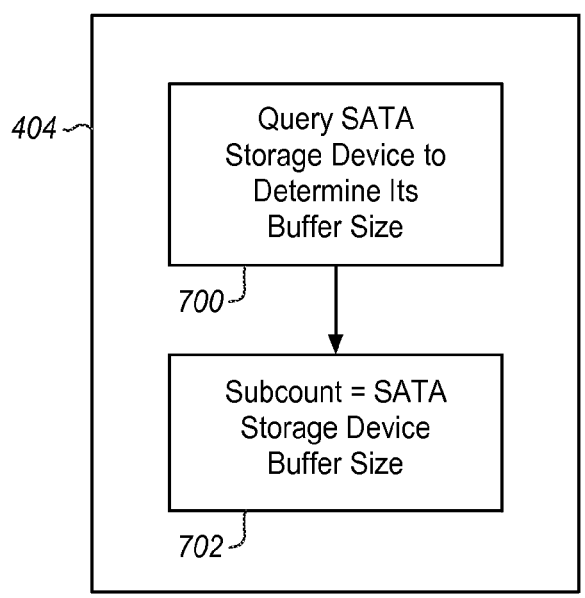

FIGS. 5 to 7 are flowcharts providing exemplary additional details of step 404 of FIG. 4 to determine a subcount value less than the original count in a DMA SETUP FIS received from a SATA storage device. In one exemplary embodiment is shown in FIG. 5, step 500 determines the subcount as a predetermined fixed buffer size. The predetermined fixed buffer size may be set by the administrator in installing or configuring the SAS expander and/or may be determined as a statically configured parameter of the SAS expander. Where an administrator manually determines the predetermined fixed size, any number of heuristics and factors may be considered in selecting an appropriate size including, for example, desired performance goals as compared to past performance measurements, known buffer sizes within any or all of the storage devices, etc. In another exemplary embodiment shown in FIG. 6, step 600 determines the subcount based on the size of a buffer in the bridge logic associated with the SATA storage device. The bridge logic of the enhanced SAS expander may comprise a memory buffer logically subdivided to provide a portion of the buffer for use with a corresponding one of the plurality of storage devices. Alternatively, the bridge logic may comprise distinct buffer memories each associated with a corresponding one of the SATA storage devices. In still another exemplary embodiment shown in FIG. 7, the subcount may be determined based on a buffer size of a buffer in within each of the SATA storage device. In such an embodiment, step 700 may query the SATA storage device to determine its buffer size and step 702 may set the subcount value equal to the buffer size of the corresponding SATA storage device. Alternatively, step 702 may set the subcount value to a value derived from a function of the SATA storage device buffer size (e.g., a predetermined percentage portion of the total buffer size associated with the SATA storage device).

Those of ordinary skill in the art will readily recognize numerous additional an equivalent steps that may be provided in the processing of the methods of FIG. 4 through 7. For example, error recovery and retry techniques well known to those of ordinary skill in the art may be employed to recover from anomalous conditions arising in the midst of the modified DMA transfers. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a switching device adapted to couple with a Serial Attached SCSI Serial Advanced Technology Attachment Tunneling Protocol initiator (SAS/STP initiator device) and adapted to couple with a plurality of Serial Advanced Technology Attachment (SATA) storage devices, the method comprising:

receiving, by the switching device, a Direct Memory Access (DMA) SETUP Frame Information Structure (FIS) from a SATA storage device, wherein the DMA SETUP FIS specifies a maximum size of data to be transferred from the SAS/STP initiator device to the storage device before another DMA SETUP FIS is received from the SATA storage device; and transmitting, from the switching device, a plurality of new DMA SETUP FISs to the SAS/STP initiator device, wherein each new DMA SETUP FIS specifies a subcount size of data to be transferred from the SAS/STP initiator device to the SATA storage device that is less than the maximum size of data to be transferred, and wherein the sum of the subcount size of data of each new DMA SETUP FIS is not greater than the maximum size of data.

2. The method of claim 1 further comprising:
determining the subcount size of data for each of the new DMA SETUP FISs as a predetermined fixed value.

3. The method of claim 1 further comprising:
determining the subcount size of data for each of the new DMA SETUP FISs as equal to a size of a buffer within the switching device.

4. The method of claim 1
wherein the switching device comprises a plurality of buffers each associated with a corresponding SATA storage device,
the method further comprising:
determining the subcount size of data for each of the new DMA SETUP FISs as equal to a size of a buffer that is associated with the SATA storage device.

5. The method of claim 1 further comprising:
determining the subcount size of data for each of the new DMA SETUP FISs as equal to a size of a buffer within the SATA storage device.

6. The method of claim 5 further comprising:
querying the SATA storage device to determine the size of its buffer.

7. A method operable in a Serial Attached SCSI (SAS) expander for transferring data from a Serial Attached SCSI Serial Advanced Technology Attachment Tunneling Protocol initiator (SAS/STP initiator) coupled with the expander to a SATA storage device of a plurality of SATA storage devices coupled with the expander, the method comprising:

receiving, by the expander, a Register Frame Information Structure (FIS) comprising a command (COMMAND FIS) from the SAS/STP initiator, wherein the COMMAND FIS specifies an I/O request size indicating a size of data to be exchanged with the SATA storage device, and wherein the COMMAND FIS is directed to the SATA storage device;

transmitting, by the expander, the COMMAND FIS to the SATA storage device;

a) receiving, by the expander, a Direct Memory Access (DMA) SETUP FIS from the SATA storage device, wherein the DMA SETUP FIS specifies a maximum size of data that may be transferred to the SATA storage device from the SAS/STP initiator in response to the DMA SETUP FIS;

b) determining, by the expander, a subcount size of data to be transferred from the SAS/STP initiator to the SATA storage device that is less than the maximum size of data to be transferred;

c) transmitting, by the expander, a new DMA SETUP FIS to the SAS/STP initiator, wherein the new DMA SETUP FIS specifies the subcount size of data;

d) transferring, by the expander, data between the SAS/STP initiator and the SATA storage device wherein the amount of data forwarded is no greater than the subcount size of data;

e) repeating steps b), c), and d) until the amount of data exchanged is equal to the maximum size of data or is equal to the I/O request size; and repeating the steps of a), b), c), d), and e) until the amount of data exchanged is equal to the I/O request size.

8. The method of claim 7
wherein the step of determining further comprises:
determining the subcount size of data as a predetermined fixed value.

9. The method of claim 8
wherein the step of determining further comprises:
determining the subcount size of data as a predetermined fixed value equal to a buffer size in each of the plurality of SATA storage devices.

10. The method of claim 9 further comprising;
querying each SATA storage device to determine the size of its buffer.

11. The method of claim 7
wherein the step of determining further comprises:
determining the subcount size of data as the size of a buffer in the expander associated with the SATA storage device, and
wherein the step of forwarding further comprises:
receiving data from the SAS/STP initiator;
storing the received data into the buffer; and
transmitting the data stored in the buffer to the SATA storage device.

12. A switching device comprising:
a front-end port adapted for coupling the switching device with a Serial Attached SCSI Serial Advanced Technology Attachment Tunneling Protocol initiator (SAS/STP initiator);
a plurality of back-end ports each adapted to couple the switching device with a corresponding SATA storage device; and
bridge logic coupled with the front-end port and coupled with the plurality of back-end ports,
wherein the bridge logic is adapted to receive a Direct Memory Access (DMA) SETUP Frame Information Structure (FIS) from a SATA storage device through its corresponding back-end port, wherein the DMA SETUP FIS specifies a maximum size of data to be transferred from the SAS/STP initiator to the SATA storage device before another DMA SETUP FIS is received from the SATA storage device, and
wherein the bridge logic is further adapted to transmit a plurality of new DMA SETUP FISs to the SAS/STP initiator, wherein each new DMA SETUP FIS comprises a subcount size of data that is less than the maximum size of data, and wherein the sum of the subcount size of data of each new DMA SETUP FIS is not greater than the maximum size of data.

13. The switching device of claim 12
wherein the bridge logic is further adapted to determine the subcount size of data for each of the new DMA SETUP FISs as a predetermined fixed value.

14. The switching device of claim 12
wherein the bridge logic is further adapted to determine the subcount size of data for each of the new DMA SETUP FISs as equal to the size of a buffer within the switching device.

15. The switching device of claim 12
wherein the bridge logic further comprises:
a plurality of buffers each associated with a corresponding back-end port,
wherein the bridge logic is further adapted to determine the subcount size of data for each of the new DMA SETUP FISs as equal to the size of the buffer associated with the back-end port through which the DMA SETUP FIS was received.

16. The switching device of claim 12
wherein the bridge logic is further adapted to determine the subcount size of data for each of the new DMA SETUP FISs as equal to the size of a buffer within the SATA storage device.

17. The switching device of claim 16
wherein the bridge logic is further adapted to query the SATA storage device to determine the size of its buffer.

18. The switching device of claim 12
wherein the switching device is a Serial Attached SCSI (SAS) expander.

* * * * *